United States Patent
Park

[11] Patent Number: 5,883,614
[45] Date of Patent: Mar. 16, 1999

[54] REFLECTION TYPE DISPLAY UTILIZING CHARGE COUPLED DEVICES

[75] Inventor: Sang-Sik Park, Seoul, Rep. of Korea

[73] Assignee: Samsung Electronics Co., Ltd., Rep. of Korea

[21] Appl. No.: 707,921

[22] Filed: Sep. 10, 1996

[30] Foreign Application Priority Data

Sep. 13, 1995 [KR] Rep. of Korea ............... 1995 29831

[51] Int. Cl.⁶ ......................................... G09G 3/34
[52] U.S. Cl. ...................... 345/147; 345/84; 348/755; 348/764; 348/770; 348/781; 348/782
[58] Field of Search ................ 345/84, 85, 147, 345/148; 348/755, 764, 770, 781, 782

[56] References Cited

U.S. PATENT DOCUMENTS

| | | | |
|---|---|---|---|
| 5,096,279 | 3/1992 | Hornbeck et al. | 359/230 |
| 5,170,283 | 12/1992 | O'Brien et al. | 359/291 |
| 5,287,096 | 2/1994 | Thompson et al. | 345/147 |
| 5,452,024 | 9/1995 | Sampsell | 348/755 |
| 5,523,803 | 6/1996 | Urbanus et al. | 348/771 |
| 5,589,852 | 12/1996 | Thompson et al. | 345/147 |
| 5,686,939 | 11/1997 | Millward et al. | 345/148 |

*Primary Examiner*—Mark K. Zimmerman
*Assistant Examiner*—Vincent E. Kovalick
*Attorney, Agent, or Firm*—Myers Bigel Sibley & Sajovec

[57] ABSTRACT

A reflection type display device wherein the brightness of pixels is controlled by deflecting a reflecting surface corresponding to a pixel in the reflection type display device for a time proportional to a charge transmitted to the pixel. A reflecting surface capable of deflection is charged and a region adjacent the reflecting surface is charged with an initial charge which is proportional to the desired brightness of the pixel and of sufficient magnitude and polarity to deflect the reflecting surface to a reflection angle. The region adjacent the reflecting surface is discharged so as to maintain the magnitude of the charge of the region adjacent the reflecting surface above the magnitude of charge sufficient to deflect the reflecting surface so that the reflecting surface remains deflected for the time corresponding to the desired brightness of the pixel.

16 Claims, 3 Drawing Sheets ically as the number of grey scales increases the problem of changing states of all of the cells in the display becomes even more problematic as the devices must be capable of two changes of state within $\frac{1}{2^n}$ of the refresh time.

REFLECTION TYPE DISPLAY UTILIZING CHARGE COUPLED DEVICES

FIELD OF THE INVENTION

The present invention relates to image display devices and more particularly to reflection type display devices.

BACKGROUND OF THE INVENTION

A deformable mirror device is similar to a small mirror which may rotate with respect to a fixed axis. Deformable mirror devices are widely utilized in reflection type display devices. The use of a deformable mirror device is illustrated in FIG. 1 which refers to U.S. Pat. No. 5,287,096.

As seen in FIG. 1 a reflecting surface 10 may rotate about a fixed axis. The degree of rotation of the reflecting surface 10 is illustrated by the dashed lines of FIG. 1. Light incident upon the reflecting surface 10 is reflected based upon whether the reflecting surface 10 is tilted. The reflected light from the reflecting surface 10 is then focused on a screen to form a portion of an image.

A complete image is formed by selectively tilting a number of reflecting surfaces such that each reflecting surface corresponds to a different portion of an image. Each reflecting surface, therefore, corresponds to a "picture element" or "pixel" and the pixels combine to create an image. The pixels are then repeatedly scanned at a "refresh rate" to provide the impression that the pixels create an image. The amount of time between refresh of a pixel is called the refresh time.

By varying the percentage of the refresh time that the reflecting surfaces are tilted the intensity of the light focused on the screen may be varied to create an image. Thus, for example, if a reflecting surface is tilted for the entire refresh time then the maximum intensity of light is focused on the screen to create the brightest portion of the screen. If, however, the reflecting surface is only tilted for 50% of the refresh time, then less light intensity is focused on the screen because light is only focused on the screen for half the time of the previous example. The intensity of light, and, therefore, the brightness of a portion of the screen, may in such a manner be controlled by controlling the duration which the reflecting surface is tilted.

In a conventional system, to adjust the brightness of portions of the screen to provide an image an analog image signal is digitally processed. This digital processing is conventionally carried out utilizing a static random access memory (SRAM) which is formed on a substrate under a reflection plate. The digital technology then adjusts the time that the SRAM cell is in the "1" state. The time that the SRAM cell is in the "1" state is adjusted by providing a digital value where the most significant bit of the digital value corresponds to $\frac{1}{2}$ the refresh time of the display and where the least significant bit of the digital value corresponds to $\frac{1}{2^n}$ of the refresh time, where n is the number of bits in the digital value. Thus, the time that the SRAM is in the "1" state is controlled by dividing the total refresh time into n steps. This necessitates in each SRAM cell of the display being capable of being updated to go from the "0" state to the "1" state and back to the "0" state in $\frac{1}{2^n}$ of the refresh time.

Unfortunately, as the number of levels of brightness increases the speed with which the SRAM must change states also increases. Thus, for example, with an 8 bit value which results in a 256 level gray scale, the display device should be capable of changing the state of each SRAM cell in the entire array of cells twice within 65 microseconds. As the number of pixels in the display increases, the ability to revise the SRAM cell states within the necessary time becomes more difficult. Furthermore, as the number of grey scales increases the problem of changing states of all of the cells in the display becomes even more problematic as the devices must be capable of two changes of state within $\frac{1}{2^n}$ of the refresh time.

In addition to the requirements of high speed SRAM to control the reflecting plates, a display device utilizing the conventional digital technology typically incorporates devices to digitally process the analog image signal. These devices may be numerous and may also suffer from having to meet the same performance levels as the SRAM cells which control the reflecting surfaces.

In light of the above discussion, there exists a need for improvements in reflection type display devices.

SUMMARY OF THE INVENTION

In view of the above discussion, it is an object of the present invention to provide a reflection type display device which does not require increased performance of memory devices to increase the size of an array of pixels of the display device.

A further object of the present invention is to provide an increase in the number levels of brightness which may be provided by a reflection type display device.

Yet another object of the present invention is to provide a reflection type display device which allows for reduced signal processing of the image signal.

These and other objects of the present invention are provided by controlling the brightness of pixels in a reflection type display by deflecting a reflecting surface corresponding to a pixel in the reflection type display device for a time proportional to a charge transmitted to the pixel.

By transmitting a charge proportional to the brightness of the pixel to the pixel and deflecting a reflecting surface corresponding to the pixel for a time proportional to the charge transmitted to the pixel the image signal need not be digitally processed. Thus, the ancillary apparatus for digital processing of the image signal may be eliminated in the reflection type image display system. Furthermore, because the time of deflection is proportional to the analog video signal converted to a charge, the present invention does not require the quantization to discrete levels such as is utilized in a conventional system. Thus, rather than providing a number of discrete levels of brightness, the present invention may provide a continuous spectrum of levels of brightness as the magnitude of charge changes.

In a particular embodiment of the present invention, the reflecting surface is deflected by charging the reflecting surface such that a charge transmitted to the pixel causes the reflecting surface to deflect to a deflection angle. The charge transmitted to the pixel is then dissipated to maintain the deflection of the reflecting surface for a time corresponding to the desired brightness of the pixel. The transmission of charge and the dissipation of charge may be carried out for each pixel in the reflection type display. By using electrostatic attraction and charge dissipation, the present invention need not require the state changes of a conventional SRAM reflection type display device. Thus, the present invention does not suffer from the limitations caused by increasing the number of picture elements in a display.

The advantages of the present invention are also obtained in an embodiment of the present invention where the brightness of a pixel is proportional to the time a reflecting surface is deflected to the reflection angle. The pixel utilizes a reflection type image display device having a reflecting surface capable of deflection to provide a reflection angle. The reflecting surface is charged and a region adjacent the reflecting surface is charged with an initial charge which is proportional to the desired brightness of the pixel and of sufficient magnitude and polarity to deflect the reflecting surface to the reflection angle. The region adjacent the reflecting surface is discharged so as to maintain the magnitude of the charge of the region adjacent the reflecting surface above the magnitude of charge sufficient to deflect the reflecting surface so that the reflecting surface remains deflected for the time corresponding to the desired brightness of the pixel. The reflecting surface may then be illuminated to provide a region of varying brightness. Preferably, the region adjacent the reflecting surface is charged with a voltage proportional to a portion of a video signal corresponding to a pixel of a display such that the time the reflecting surface is deflected is proportional to the brightness of the pixel of the display.

In a further embodiment of the present invention, a plurality of reflecting surfaces are arranged in an array such that each reflecting surface corresponds to a pixel of a display.

In one embodiment of the present invention providing a reflection type display, input means convert a video signal into a signal charge. A plurality of pixels are arranged in a two dimensional array wherein each of the plurality of pixels of the array reflect light onto a specific portion of a screen and wherein each pixel reflects light for a time proportional to a charge transmitted to the pixel. An array of charge coupled devices transmit the signal charge to the pixels of the array of pixels wherein the charge transmitted to a pixel in the array is proportional to the time that the pixel is to reflect light onto a specific portion of a screen.

In a further embodiment of the present invention, each of the pixels of the plurality of pixels include a capacitor which stores the signal charge transmitted by the array of charge coupled devices. A reflecting plate is formed on a supporting stand adjacent the capacitor and positioned such that charge stored by the capacitor causes deflection of the reflecting plate to a deflection angle if the charge stored by the capacitor is greater than a deflection threshold. Charge reset means drains the charge from the capacitor.

In particular embodiments of the present invention, the reflecting plate is formed on a flat plate formed of polysilicon. Furthermore, the charge reset means may include an electrical resistance and a power source connected to the capacitor through the electrical resistance. The charge reset means may also comprise a metal-oxide-semiconductor field effect transistor connecting the capacitor to a power source.

The advantages of the present invention may also be realized in an element for a reflection type display device. The element includes a substrate of a first conductivity type semiconductor material and a first region of a second conductivity type semiconductor material formed in the substrate. A second region of a second conductivity type semiconductor material is also formed in the substrate and is spaced from the first region. A third region of a second conductivity type semiconductor material is formed in the substrate opposite the second region from the first region and a fourth region of a second conductivity type semiconductor material is formed in the substrate opposite the first region from the second region. An insulating layer is formed on the substrate and covers the first region, the second region, the third region and the fourth region.

A first electrode is formed on the insulating layer and positioned over the first region. A second electrode is formed on the insulating layer between the first region and the second region and extends over the first electrode to form a gap between the first electrode and the second electrode. A third electrode is formed on the insulating layer between the second region and the third region. A pillar of material capable of supporting an electrostatic charge is formed on the fourth region and extends through the insulating layer. A plate of material capable of supporting an electrostatic charge is formed on the pillar and cantilevered to extend over the second region.

In a particular embodiment of the present invention, the display element is formed such that the first conductivity type semiconductor material comprises p-type semiconductor material and the second conductivity type semiconductor material comprises n-type semiconductor material. The plate and the pillar may also be formed of polysilicon. The insulating layer may be formed of a material selected from the group consisting of oxides and nitrides.

A device according to the present invention, may provide a transmission channel and a capacitor region formed in a substrate and spaced apart from each other. Discharge regions are provided opposite the capacitor from the transmission channel and opposite the transmission channel from the capacitor. A first transmission electrode is formed on an insulating layer and positioned over the transmission channel. A second transmission electrode is also formed on the insulating layer between the transmission channel and the capacitor and extends over the first transmission electrode to form a gap between the first transmission electrode and the second transmission electrode. When a bias is applied to the second transmission electrode charge is transferred from the transmission channel to the capacitor. In such a device the charge proportional to the brightness of the pixels may be transferred to a location where the reflecting surface may be tilted.

A discharge electrode is formed on the insulating layer between the capacitor and the discharge region opposite the capacitor from the transmission channel. When a bias is applied to the discharge electrode charge is transferred from the capacitor to the discharge region. The element according to the present invention may, thereby, control the time that a reflecting surface is tilted such that the time the reflecting surface is tilted is proportional to the charge transferred to the capacitor.

A supporting stand is formed on the discharge region opposite the transmission channel from the capacitor and extending through the insulating layer. A reflection plate is formed on the supporting stand and extends over the capacitor such that the reflection plate deflects to a deflection angle when the charge stored by the capacitor region is greater than a deflection threshold. In such a structure, the supporting stand and reflection plate may be charged.

DETAILED DESCRIPTION OF THE PREFERRED EMBODIMENTS

Figure 1:
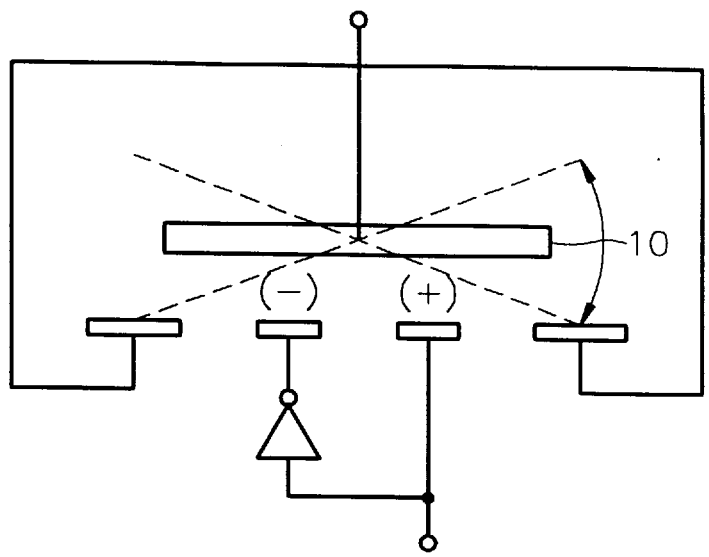
FIG. 1 is a cross sectional view illustrating one example of a conventional reflection type image display device.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. Moreover, the terms "first conductivity type" and "second conductivity type" refer to opposite conductivity types such as N or P-type and each embodiment described and illustrated herein includes its complementary embodiment as well.

Figure 2:
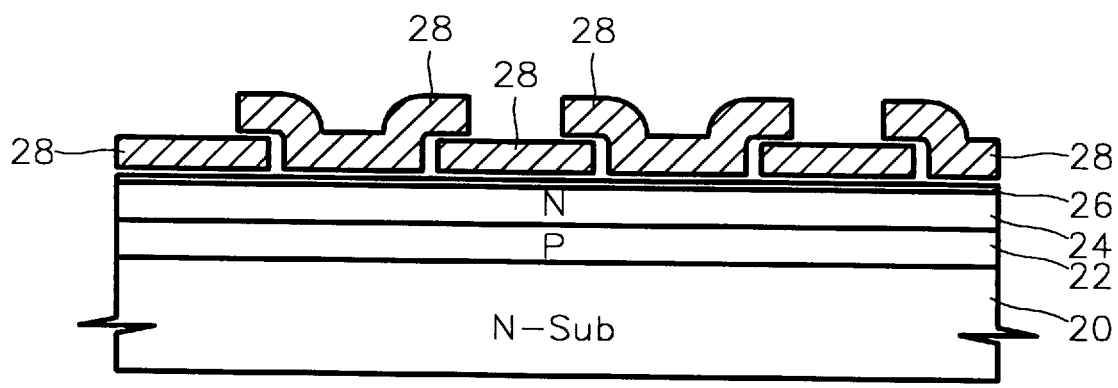
FIG. 2 is a cross sectional view illustrating a charge coupled device.

FIG. 2 illustrates a charge coupled device with a buried channel. As seen in FIG. 2 an n-type semiconductor substrate 20 has formed on it a p-type well 22 and an n-type transmission channel 24. An insulating layer 26 is formed on the transmission channel 24 and electrodes 28 are formed on the insulating layer 26.

In operation, signal charge which is accumulated beneath one transfer electrode in the transmission channel 24 is transferred in the transmission channel to an area beneath an adjacent electrode by a clock pulse applied to the electrodes. In such a manner charge may be transferred down the transmission channel 24 by successively pulsing the electrodes 28 with phased clock pulses.

Figure 3:
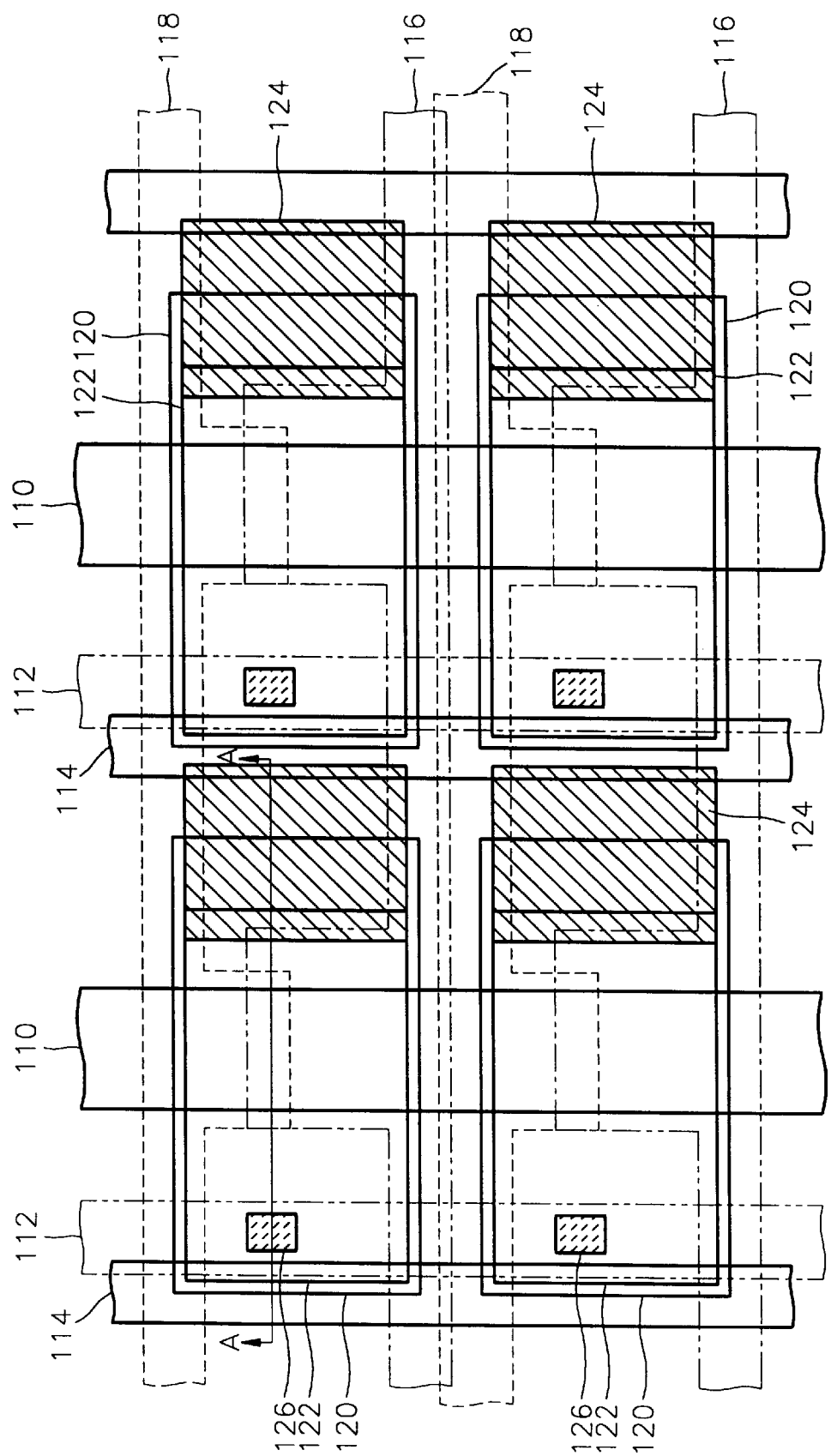
FIG. 3 is a top-view of a reflection type display device according to the present invention.

FIG. 3 illustrates a layout of a portion of a reflection type image display according to the present invention. As seen in FIG. 3, a transmission channel 110 of a buried channel charge coupled device is illustrated. The transmission channel 110 may be an n-type semiconductor channel. Charge is transferred along this vertical transmission channel 110 which is proportional to the brightness of the pixels along the channel.

An n-type discharge region 112 is also illustrated in FIG. 3. The n-type discharge region 112 also runs vertically in FIG. 3 and is parallel to the transmission channel 110. A discharge gate 114 is also formed on the insulating layer formed on the substrate and overlaps the discharge region 112.

A first transfer electrode 116 runs horizontally and has protuberances formed above each transmission channel 110. Each protuberance of the transfer electrode 116 may correspond to a pixel of a reflection type display. A second transfer electrode 118 is also illustrated in FIG. 3 and runs parallel to the first transfer electrode 116. The second transfer electrode 118 also has protuberances corresponding to the protuberances of the first transfer electrode 116. As is illustrated in FIG. 3, a device according to the present invention may have a plurality of pixels or elements arranged in an array to provide a display device.

An n-type conductivity region 124 is formed in the substrate to act as a capacitor. The capacitor region 124 is formed such that the discharge gate 114 and the transfer electrode 116 overlap the capacitor region.

A supporting stand or pillar 126 is also shown in FIG. 3. A reflection plate 120 is shown in FIG. 3 and is formed on the supporting stand 126 and cantilevers over the capacitor region 124. A reflecting surface 122 is formed on the reflecting plate 120 to reflect light incident upon the reflecting surface 122. The reflecting plate 120 and the supporting stand 126 are fabricated such that the reflecting plate 120 may be deflected to a deflection angle such that light incident upon the reflecting surface 122 is reflected to a different angle than when the reflection plate 120 is not deflected. The reflection plate 120 is also preferably formed such that it is capable of being maintained at a specified potential.

In operation, charge is transmitted through the transmission channel 110 through the charge coupled devices to a capacitor region 124 which resides adjacent a reflection plate 120. If the magnitude of charge transferred to the capacitor 124 is above a deflection threshold then the reflection plate 120 deflects to the deflection angle. The reflection plate 120 remains deflected until the charge falls below the deflection threshold. Thus, the time that the reflection plate 120 remains deflected is proportional to the amount of charge transferred to a capacitor 124. Accordingly, the brightness of a pixel of a screen is proportional to the charge transmitted to the capacitor corresponding to that pixel.

Figure 4:
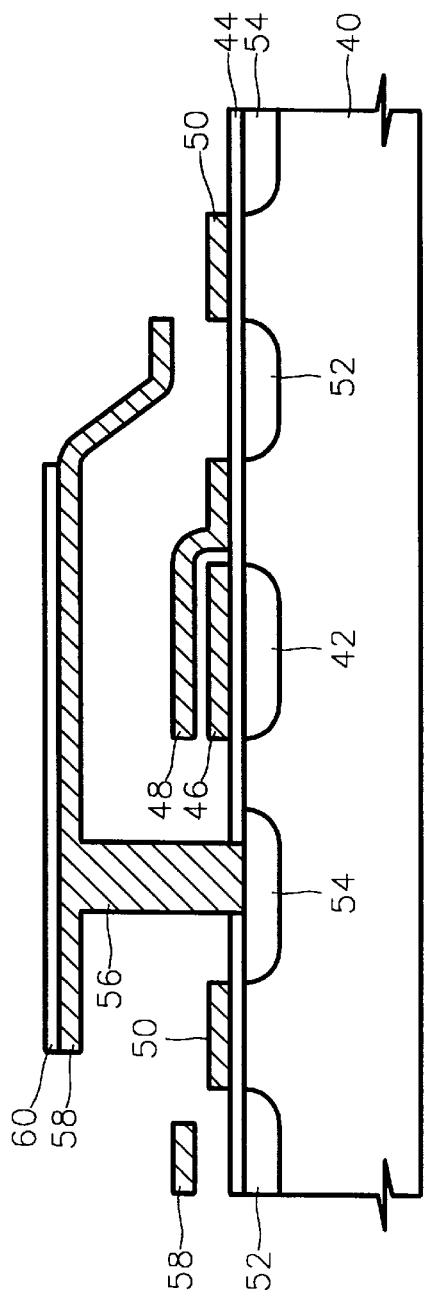
FIG. 4 is cross-sectional taken along section line A–A' of FIG. 3.

FIG. 4 is a cross-sectional view of one element of the device of FIG. 3 taken along the line A–A'. As seen in FIG. 4, a substrate 40 of a first conductivity type semiconductor material has a first region 42 of a second conductivity type semiconductor material formed in the substrate. This first region 42 corresponds to a transmission channel 110.

A second region 52 of a second conductivity type semiconductor material is also formed in the substrate 40 and is spaced from the first region 42. This second region 52 may act as the capacitor 124.

Third and fourth regions 54 may act as the discharge regions 112. The third and fourth regions 54 are of a second conductivity type semiconductor material and are formed in the substrate 40 opposite the second region 52 from the first region 42 and opposite the first region 42 from the second region 52, respectively.

Preferably, the first conductivity type semiconductor material comprises p-type semiconductor material and the second conductivity type semiconductor material comprises n-type semiconductor material. However, as will be appreciated by those of skill in the art other combinations may be utilized.

An insulating layer 44 is formed on the substrate 40 and covers the first region 42, the second region 52 and the third and fourth regions 54. The insulating layer is preferably formed of an oxide or a nitride.

A first electrode 46, which may act as transmission electrode 118, is formed on the insulating layer 44 and is positioned over the first region 42. A second electrode 48, which may act as the transmission electrode 116, is formed on the insulating layer between the first region 42 and the second region 52. The second electrode 48 extends over the first electrode 46 to form a gap between the first electrode 46 and the second electrode 48. A third electrode 50 is formed on the insulating layer between the second region 52 and the third region 54.

A pillar 56 of material, corresponding to the support 126, is capable of conducting a charge and is formed on the fourth region 54 and extends through the insulating layer 44 to contact the fourth region 54. A plate 58 corresponding to the reflection plate 120 is formed of material capable of supporting a charge and is formed on the pillar 56 and cantilevered to extend over the second region 52. A surface of reflective material, corresponding to the reflective surface 122, is also formed on the reflection plate 58. Preferably, the pillar 56 and the reflection plate 58 are formed of polysilicon.

In operation, an analog input signal corresponding to an image to be displayed is converted into charge. This charge is transmitted to a plurality of elements or pixels arranged in a vertical and horizontal pattern to form a display array. The charge is transmitted along the transmission channel 42, 110 by charge coupled devices. Each element of the array corresponds to a pixel such that charge corresponding to the brightness of the pixel is transmitted to the pixel. The charge provided in the transmission channel 42 is then transferred to the capacitor 52 through application of a phased timing signal to the transmission electrode 48.

The pixel includes the reflection plate 58 which is formed on the supporting stand 56 such that when the reflection plate 58 is biased and the capacitor 52 stores a charge of sufficient magnitude, the reflection plate 58 deflects to a deflection angle. The deflection of the reflection plate 58 is based upon the potential difference between the reflection plate 58 and the capacitor 52. As long as the potential difference between the reflection plate 58 and the capacitor 52 remains above the predetermined level of the deflection threshold, then the reflection plate 58 remains deflected.

As illustrated in FIG. 4, this ability to deflect to a deflection angle may be accomplished by a cantilevered reflection plate 58 which extends over the capacitor 52. The deflection threshold may be established by the geometry of the supporting stand 56 and the reflection plate 58. Similarly, the geometry of the supporting stand 56 and the reflection plate 58 may be established to produce a predetermined deflection angle for the deflection plate 58.

The bias which is applied to the reflection plate 58 may be applied through the discharge region 54. Thus, the reflection plate 58 may be electrostatically charged. The duration that the reflection plate 58 is deflected is determined by the duration of time that the capacitor 52 remains charged with a magnitude of charge such that the potential difference is above the deflection threshold. The discharge gate 50 may be utilized to discharge the capacitor 52 by application of a bias to the discharge gate 50.

The capacitor 52 may dissipate its stored charge either passively or actively. In an active case, the capacitor may be discharged through a charge reset which is comprised of a resistor and an electrical power source. Preferably, the capacitor 52 is connected to the power source through a metal-oxide-semiconductor transistor.

Figure 5:
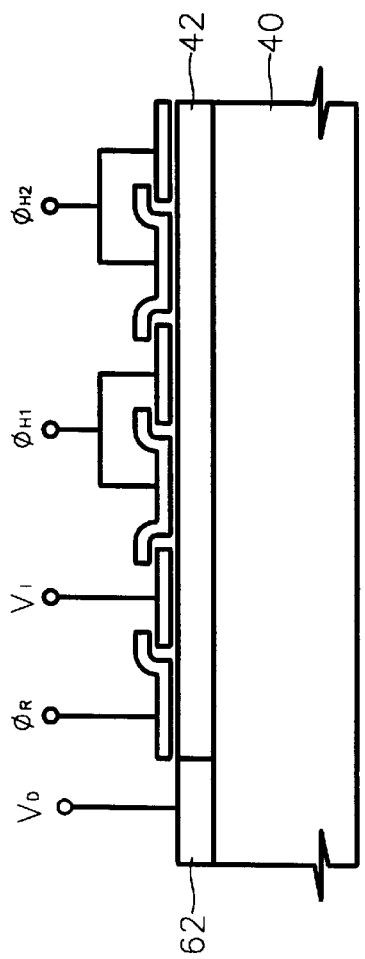
FIG. 5 is a schematic representation of a reflection type display device according to the present invention.

Referring now to the structure of the signal input port of the present invention shown in FIG. 5, a video signal is input to the $V_I$ terminal of the charge coupled device if FIG. 5. $V_D$ denotes the electrostatic voltage input and $\phi_V$ and $\phi_H$ are clock inputs having vertical and horizontal transmission periods, respectively. A CCD transmission channel 42 and the transmission channel 62 of a port adjacent transmission channel 42 are also illustrated in FIG. 5.

When $\phi_V$ is "on" electrons in a magnitude proportional to the voltage difference between $V_I$ and $V_D$ go under the $V_I$ gate. If $\phi_V$ is "off", these electrons remain under the $V_I$ gate and are transmitted by the operation of $\phi_H$.

The transmitted signal charge is provided to each pixel (FIG. 4) through the transmission channel 42 and the clock signal is applied to transmission electrode 48 to transfer the charge to the capacitor 52. Thus, a potential difference proportional to the amount of signal charge transferred from the charge coupled device is generated and an electrical force between the reflection plate 58 and the capacitor 52 is generated such that the reflection plate 58 is tilted toward the capacitor 52. With the tilt of the reflection plate 58, light incident upon the reflecting surface 60 is sent in a predetermined direction to form a portion of an image.

The charge stored in capacitor 52 may then be discharged to the n-type discharge region 54 by a clock supplied to the discharge gate 50. The discharge of capacitor 52 is such that the voltage difference between the reflection plate 58 and the capacitor 52 is maintained above the predetermined deflection threshold for a time proportional to the charge in the capacitor 52. When the voltage fall below the threshold the reflection plate 58 returns to its original position. The time it takes to discharge or dissipate the charge stored in the capacitor 52 is proportional to the amount of charge stored in the capacitor 52 and, thus, it is possible to tilt the reflection plate 58 for a time proportional to the charge stored in the capacitor 58. Furthermore, because the charge stored in the capacitor 52 is proportional to the brightness of a pixel it is possible to control the brightness of the pixel based upon the charge supplied to the capacitor 52 of the pixel.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method of controlling the brightness of a pixel utilizing a reflection type image display device having a reflecting surface capable of deflection to provide a reflection angle and wherein the brightness of the pixel is proportional to the time the reflecting surface is deflected to the reflection angle, the method comprising the steps of:

charging the reflecting surface;

charging a region adjacent the reflecting surface with an initial charge which is proportional to the desired brightness of the pixel and of sufficient magnitude and polarity to deflect the reflecting surface to the reflection angle; and discharging the region adjacent the reflecting surface through a resistance connected to a power source so as to maintain the magnitude of the charge of the region adjacent the reflecting surface above the magnitude of charge sufficient to deflect the reflecting surface so that the reflecting surface remains deflected of the time corresponding to the desired brightness of the pixel.

2. The method according to claim 1, further comprising the step of:

illuminating the reflecting surface to provide a region of varying brightness such that the brightness of the region is proportional to the time the reflecting surface is deflected.

3. The method according to claim 2, wherein said charging step comprises charging a region adjacent the reflecting surface with a voltage proportional to a portion of a video signal corresponding to a pixel of a display such that the time the reflecting surface is deflected is proportional to the brightness of the pixel of the display.

4. The method according to claim 3, further comprising the step of:

providing a plurality of reflecting surfaces arranged in an array such that each reflecting surface corresponds to a pixel of a display; and wherein said charging and said discharging steps charge and discharge regions adjacent to each of said plurality such that the brightness of the each pixel is proportional to the portion of the video signal corresponding to the pixel to provide a display of the video signal.

5. A reflection type image display device comprising:

input means for converting a video signal into a signal charge;

a plurality of pixels arranged in a two dimensional array wherein each of said plurality of pixels of said array reflect light onto a specific portion of a screen and wherein each pixel reflects light for a time proportional to a charge transmitted to the pixel;

an array of charge coupled devices for transmitting the signal charge to the pixels of said array of pixels wherein the charge transmitted to a pixel in said array is proportional to the time that the pixel is to reflect light onto a specific portion of a screen;

wherein each of said pixels of said plurality of pixels comprises:
a capacitor which stores the signal charge transmitted by said array of charge coupled devices;
a supporting stand adjacent said capacitor;
a reflecting plate formed on said supporting stand and positioned such that charge stored by said capacitor causes deflection of said reflecting plate to a deflection angle if the charge stored by said capacitor is greater than a deflection threshold;
an electrical resistance; and
a power source connected to said capacitor through said electrical resistance for draining the charge from said capacitor.

6. An element for a reflection type display device, comprising:
a substrate of a first conductivity type semiconductor material;
a first region of a second conductivity type semiconductor material formed in said substrate;
a second region of a second conductivity type semiconductor material formed in said substrate and spaced from said first region;
a third region of a second conductivity type semiconductor material formed in said substrate opposite said second region from said first region;
a fourth region of a second conductivity type semiconductor material formed in said substrate and opposite said first region from said second region;
an insulating layer formed on said substrate and covering said first region, said second region, said third region and said fourth region;
a first electrode formed on said insulating layer and positioned over said first region;
a second electrode formed on said insulating layer between said first region and said second region and extending over said first electrode to form a gap between said first electrode and said second electrode;
a third electrode formed on said insulating layer between said second region and said third region;
a pillar of material capable of supporting an electrostatic charge formed on said fourth region and extending through said insulating layer; and
a plate of material capable of supporting an electrostatic charge formed on said pillar and cantilevered to extend over said second region.

7. An element according to claim 6, further comprising a surface of reflective material formed on said plate.

8. An element according to claim 6 wherein said first conductivity type semiconductor material comprises p-type semiconductor material and wherein said second conductivity type semiconductor material comprises n-type semiconductor material.

9. An element according to claim 6 wherein said plate and said pillar are formed of polysilicon.

10. An element according to claim 6, wherein said insulating layer is formed of a material selected from the group consisting of oxides and nitrides.

11. An element for a reflection type display device, comprising:
a substrate of a semiconductor material;
a transmission channel formed in said substrate;
a capacitor region formed in said substrate and spaced from said transmission channel;
discharge regions formed in said substrate opposite said capacitor from said transmission channel and opposite said transmission channel from said capacitor;
an insulating layer formed on said substrate and covering said transmission channel, said capacitor region and said discharge regions;
a first transmission electrode formed on said insulating layer and positioned over said transmission channel;
a second transmission electrode formed on said insulating layer between said transmission channel and said capacitor and extending over said first transmission electrode to form a gap between said first transmission electrode and said second transmission electrode such that when a bias is applied to said second transmission electrode charge is transferred from said transmission channel to said capacitor;
a discharge electrode formed on said insulating layer between said capacitor and said discharge region opposite said capacitor from said transmission channel such that when a bias is applied to said discharge electrode charge is transferred from said capacitor to said discharge region;
a supporting stand formed on said discharge region opposite said transmission channel from said capacitor and extending through said insulating layer; and
a reflection plate formed on said supporting stand and extending over said capacitor such that said reflection plate deflects to a deflection angle when the charge stored by said capacitor region is greater than a deflection threshold.

12. An element according to claim 11, further comprising:
a reflecting surface formed on said reflection plate for reflecting light incident upon said reflecting surface in a first direction when said reflection plate is not deflected and for reflecting light incident upon said reflecting surface in a second direction when said reflection plate is deflected to said deflection angle.

13. An element according to claim 11 wherein said reflection plate and said support stand are formed of polysilicon.

14. An element according to claim 11, wherein said insulating layer is formed of a material selected from the group consisting of oxides and nitrides.

15. A reflection type image display device comprising:
input means for converting a video signal into a signal charge;
a plurality of pixels arranged in a two dimensional array wherein each of said plurality of pixels of said array reflect light onto a specific portion of a screen and wherein each pixel reflects light for a time proportional to a charge transmitted to the pixel;
an array of charge coupled devices for transmitting the signal charge to the pixels of said array of pixels wherein the charge transmitted to a pixel in said array is proportional to the time that the pixel is to reflect light onto a specific portion of a screen;

wherein each of said pixels of said plurality of pixels comprises:
- a capacitor which stores the signal charge transmitted by said array of charge coupled devices;
- a supporting stand adjacent said capacitor;
- a reflecting plate formed on said supporting stand and positioned such that charge stored by said capacitor causes deflection of said reflecting plate to a deflection angle if the charge stored by said capacitor is greater than a deflection threshold;
- a metal-oxide-semiconductor field effect transistor connecting said capacitor to a power source so as to drain the charge from said capacitor.

16. A reflection type image display device according to claim 15, wherein said reflecting plating is formed of a flat plate formed of polysilicon.

* * * * *